Figure 2:
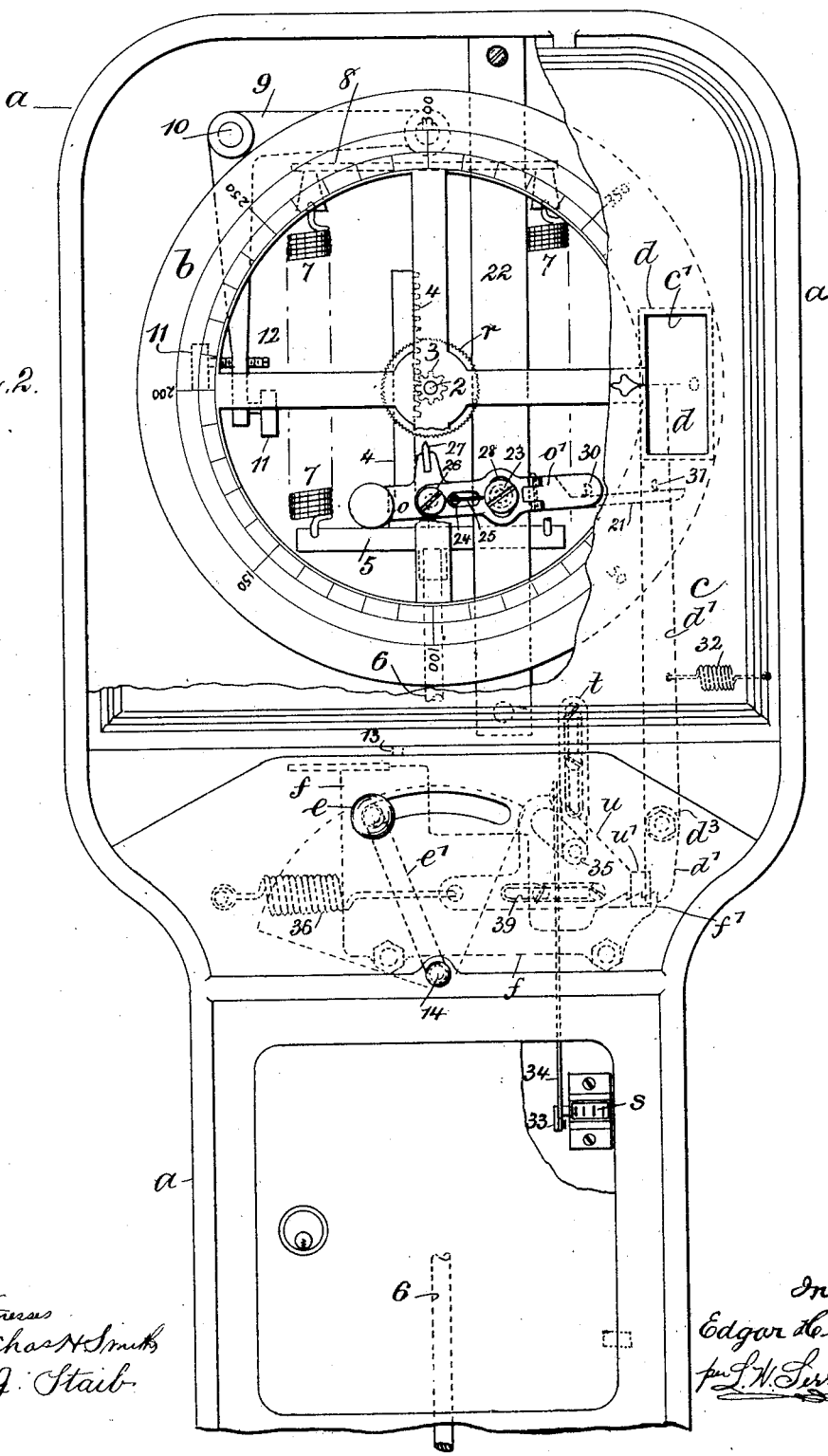

No. 664,235. Patented Dec. 18, 1900.
E. H. COOK.
COIN CONTROLLED WEIGHING MACHINE.
(Application filed Feb. 15, 1900.)
(No Model.) 3 Sheets—Sheet 1.
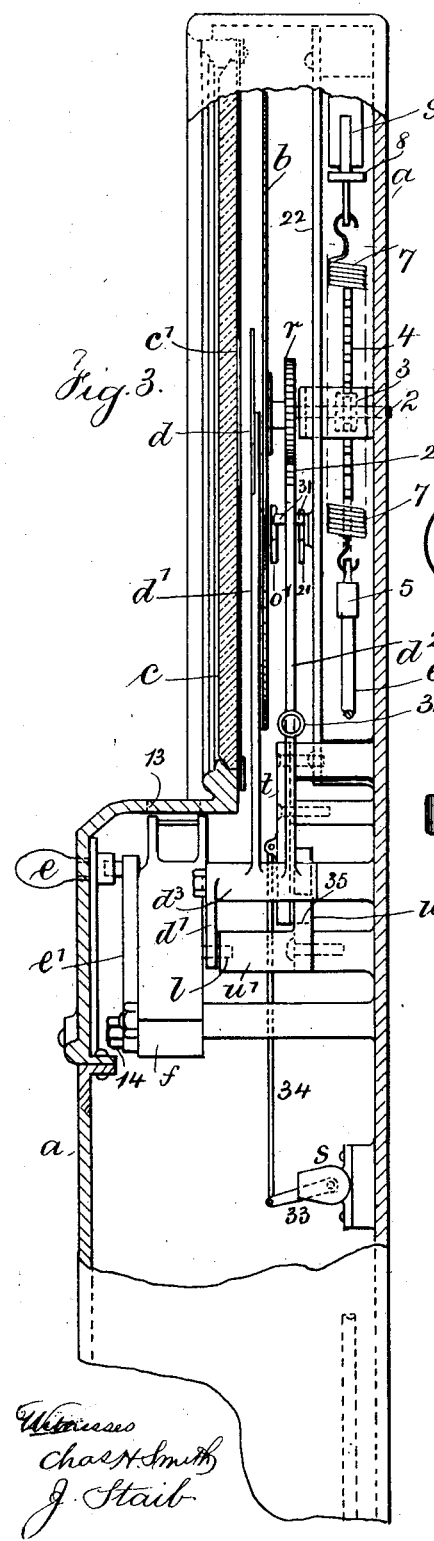
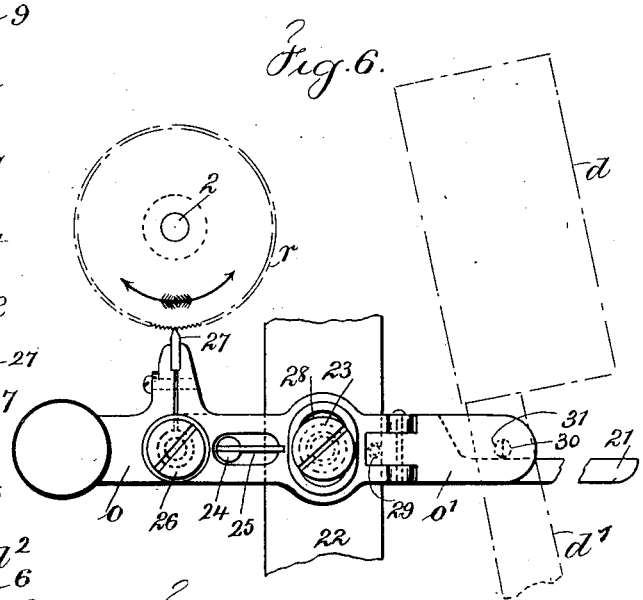
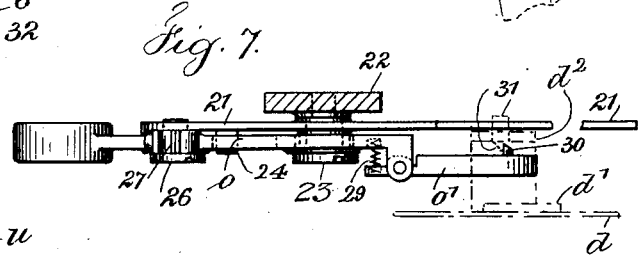
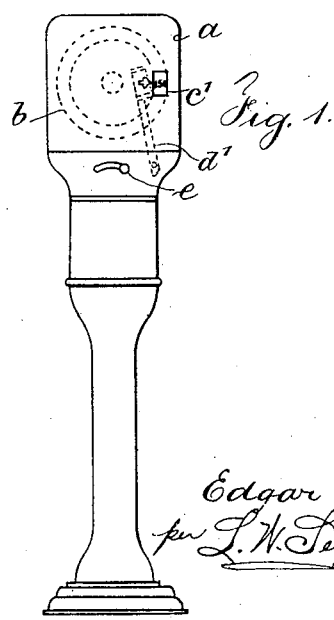
Witnesses
Chas H Smith
J. Staib
Inventor
Edgar H. Cook
per L. W. Serrell & Son
attys No. 664,235. Patented Dec. 18, 1900.
E. H. COOK.
COIN CONTROLLED WEIGHING MACHINE.
(Application filed Feb. 15, 1900.)
(No Model.) 3 Sheets—Sheet 2.

Witnesses
Chas. H. Smith
J. Staib

Inventor
Edgar H. Cook
per L. W. Serrell & Son
Atty.

THE NORRIS PETERS CO., PHOTO-LITHO., WASHINGTON, D. C.

No. 664,235. Patented Dec. 18, 1900.
E. H. COOK.
COIN CONTROLLED WEIGHING MACHINE.
(Application filed Feb. 15, 1900.)
(No Model.) 3 Sheets—Sheet 3.
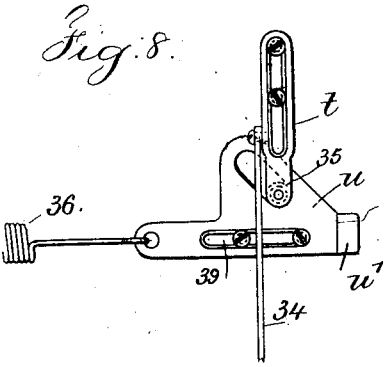
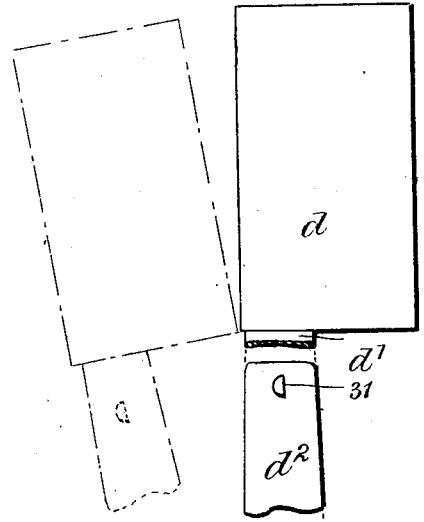
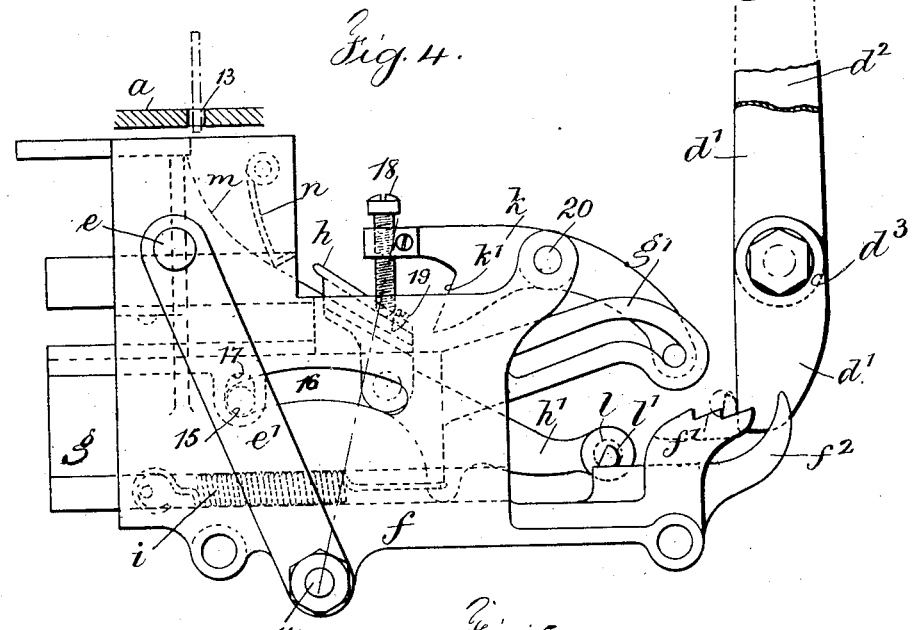
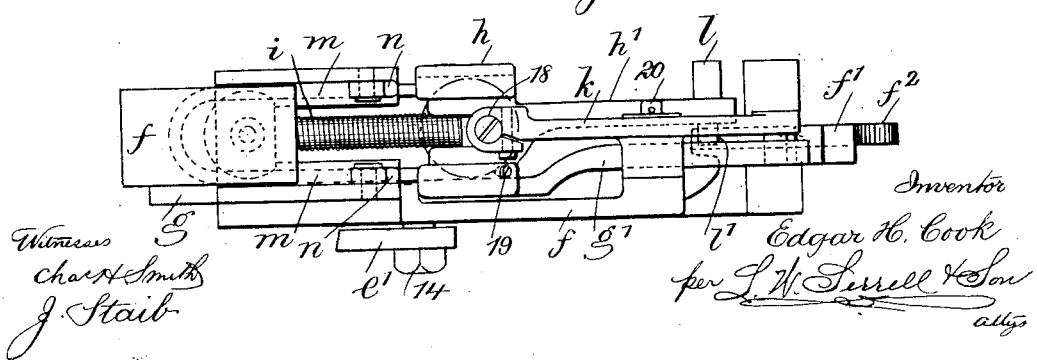
Witnesses
Chas. H. Smith
J. Staib
Inventor
Edgar H. Cook
per L. W. Serrell & Son
attys
THE NORRIS PETERS CO., PHOTO-LITHO., WASHINGTON, D. C.

UNITED STATES PATENT OFFICE.

EDGAR H. COOK, OF NEW YORK, N. Y., ASSIGNOR TO THE AUTOMATIC VENDING COMPANY, OF SAME PLACE.

COIN-CONTROLLED WEIGHING-MACHINE.

SPECIFICATION forming part of Letters Patent No. 664,235, dated December 18, 1900.

Application filed February 15, 1900. Serial No. 5,242. (No model.)

*To all whom it may concern:*

Be it known that I, EDGAR H. COOK, a citizen of the United States, residing in the borough of Brooklyn, in the city and State of New York, have invented certain new and useful Improvements in Coin-Controlled Weighing-Machines, of which the following is a specification.

Heretofore in this class of machines it has been usual to employ visible indicator-dials and index-fingers, and the index-fingers have been actuated by the insertion of a coin in the machine, the indicator-finger moving around the dial to give the weight of the person on the platform. The weighing mechanism in these machines is generally of the same character. These machines have also been made with an indicator-dial concealed behind an ornamental face, in which face there was an opening, and a cover or slide for the opening concealing the weight, the said cover or slide being actuated and moved away to discover the weight upon the insertion of a coin. My invention relates generally to the latter class of machines; and the object of the same is to simplify and make more positive the construction and operation of the machine, so as to prevent the same being tampered with and parties ascertaining their weight without employing a coin of the required denomination.

In carrying out my invention the case, the platform, its lever, and the other parts of the weighing device are generally of a usual character. The upper part of the case is provided with an ornamental face in which there is an opening, and the indicator-dial is concealed beneath the ornamental face, and the said face is provided with a pointer placed about central of the opening to indicate the weight when a shield covering the opening is moved to one side, so as to discover the dial and show the weight. I provide a coin-receiving mechanism and means for actuating the same by hand, the said coin-receiving mechanism operating an arm to which the shield is connected, so that after the person to be weighed steps upon the platform and operates the weighing mechanism a coin can be inserted in the coin-receiving mechanism, and the hand-operated mechanism is then actuated to move the said shield away from the opening in the ornamental face of the case, so that the person on the platform discovers the weight through the said opening and opposite to the pointer upon the ornamental face. I also provide means, actuated by the arm of the shield, for holding the said shield away from the opening and which means is released in order that the shield may re-cover the opening not only when the person steps off the platform, but also when the weight on the platform is slightly decreased or increased. I also provide means for registering the number of times that the machine has been in operation, the same being a tally to indicate the proper amount of money that should be found in the money box or receptacle in the machine. The details of the mechanism and the operations thereof are hereinafter more particularly set forth.

The weighing mechanism and the registering mechanism, although shown and described herein, form the subject of a separate and concurrent application filed April 19, 1900, Serial No. 13,442.

The coin-receiving mechanism, to which my invention particularly relates, comprises a crank-arm operated by hand, a reciprocating carriage moved horizontally in a frame by the crank-arm, and connections therefrom. This frame is provided with a coinway and stop-bars to prevent the coin being withdrawn. A coin-carrier having a latch-lever is pivoted to the carriage and moves therewith, and a lever pivoted to the frame is provided with means for contacting with the coin and swinging the coin-carrier and its latch-lever so as to deliver the coin and engage devices that prevent the return of the parts to a normal position until their full movement has been made and the weighing and registering devices have been thereby set in motion.

In the drawings, Figure 1 is an elevation in small size generally representing a weighing-machine according to my invention. Fig. 2 is an elevation of the case, the weighing mechanism, and some of the operative parts, with the outer face broken. Fig. 3 is a vertical section and partial elevation of the parts shown in Fig. 2. Fig. 4 is an elevation, and Fig. 5 a plan view, of the coin-receiving mechanism.

Fig. 6 is a side elevation, and Fig. 7 a plan, of the devices for locking and releasing the arm of the shield, and Fig. 8 is an elevation of the devices for actuating the registering device.

The case $a$ of the weighing-machine is of any desired character and configuration. The same contains the indicator-dial $b$, mounted upon an axis 2, and the axis is provided with a pinion 3, and there is a rack 4 engaging the pinion 3, the lower end of which is connected to a cross-head 5, and a rod 6 extends from the cross-head 5 to the lever of the weighing-platform, which parts are not shown. Helical springs 7 are connected at their lower ends to the cross-head 5 and at their upper ends to a cross-head 8, and the said cross-head is connected to a bell-crank supporting-lever 9, pivoted at 10 to the case and whose free end is provided with an adjusting-screw 12, there being stops 11 for the free end and the adjusting-screw, so that the proper tension can be applied to the springs. These parts are old in a weighing device and I do not in any sense claim the same.

I employ a face $c$ in front of the indicator-dial $b$, and which face is preferably ornamented to be attractive, and the said face is of such a character that the indicator-dial behind the same is not visible. At one side of the face $c$ I make a rectangular opening $c'$ in said face, which opening is preferably placed vertical, and there is a pointer on the surface of the face, about midway of the said opening, to produce an imaginary line which shall coincide with a line of the dial to indicate the weight. I provide a shield $d$ behind the face $c$ and covering the opening $c'$ therein. This shield is mounted upon an arm $d'$, connected to a hub $d^3$, and upon the same hub is a second arm $d^2$, the arm $d'$ being located between the face $c$ and the dial $b$ and the arm $d^2$ behind the dial $b$. On the arm $d^2$ there is a latch-stud 31, and a spring 32 is connected at one end to the arm $d^3$ and at the other end to the case $a$ of the machine. The hub $d^3$ is mounted upon an arm projecting from the case of the machine, and from the said hub there is a downward-extending arm, practically a continuation of the arm $d'$, which for the purpose of explanation is given the same letter of reference.

A coin-slot 13 is made in the case, and beneath the same is located the coin-receiving mechanism. I provide a handle $e$, projecting through a curved mortise in the case, the same being connected to a crank-arm $e'$ upon a shaft 14 within the case, and I prefer to employ a plate against the inner surface of the case connected to the handle and covering the curved mortise in the case, so as to prevent reaching or tampering with the mechanism through the said mortise. The shaft 14 is pivoted in the frame $f$ of the receiving mechanism, which frame is preferably secured to the case of the weighing-machine by studs and screws.

On the crank-arm $e'$ there is a stud 15, passing through a curved slot 16 in the frame $f$ and entering a vertically-placed slot in the reciprocating carriage $g$, the said carriage being moved back and forth by the handle $e$ and crank-arm $e'$ and the stud 15 engaging the vertical slot 17 of the said carriage. This reciprocating carriage $g$ is provided with a slotted extension $g'$, and the coin-carrier $h$ is pivoted to the reciprocating carriage, and integrally made with the said coin-carrier is a latch-lever $h'$, having through its forward end a stud $l$ on one side and a latch $l'$ on the other side, and a spring $i$, connected at one end to the frame $f$, is connected at the other end to the lower portion of the latch-lever $h'$. The coin-carrier is in the form of an open jaw, as will be seen by special reference to Figs. 4 and 5, with opposite ways to receive the coin and with a pointed adjusting-screw 19, the turning of which provides for the adjustment of the coin in the said carrier.

A lever $k$ is pivoted at 20 to an arm rising from the frame $f$, and the said lever is provided with an inclined finger $k'$ and an adjustable pin 18 on one end and a stud on the other end engaging the slot of the extension $g'$ of the carriage. The said pin 18 comes above the coin as the same is received in the carrier $h$, and on the said frame $f$ I provide a ratchet $f'$ and a stop $f^2$, the latch $l'$ resting upon a flat surface or way of the frame merging into the curved portion of the stop $f^2$, and the lower part of the arm $d'$ is adjacent to the ratchet $f$. In the operation of these parts the coin is dropped into the coin-slot 13, and it passes down the coinway $m$, beneath the stop-bars $n$, and into the coin-carrier $h$, stopping against the screw 19, the position of the coin being shown by dotted lines in Fig. 5. The stop-bars $n$ are pivoted to the opposite vertical faces of the coinway $m$. They yield and swing out as the coin passes down the coinway $m$, and their free ends are bent outward, and in an effort to withdraw a coin the same will come against the ends of the bars and be stopped.

A hand upon the handle $e$, moving the crank-arm $e'$ through its stud 15, actuates the reciprocating carriage $g$ toward the right hand, Fig. 4. The extension $g$, moving with the reciprocating carriage, causes the lever $k$ to swing on its pivot 20, the stud of the said lever rising in the slot of the extension $g'$. This movement brings the point of the pin 18 down upon the coin and pressing thereon tilts the coin-carrier and raises the integral latch-lever end $h'$ thereof, bringing the latch $l'$ upon the surface of the ratchet $f'$ as the parts move forward. With this movement the edge of the coin comes against the finger $k'$ of the lever $k$ and the coin is pushed out of the coin-carrier $h$ and drops into a suitable receptacle provided therefor. The coin drops away from the carrier as soon as the latch $l'$ engages the first tooth of the ratchet $f'$, and thereafter the mechanism cannot be returned to the normal position until the full movement has been completed. During this movement tension is applied by stretching the spring $i$ and the further forward movement brings the latch $l'$ into the second notch of the ratchet $f'$, and at this point it will be noticed that the stud $l$, which is a continuation of the latch $l'$, comes in contact with the lower end of the arm $d'$, as shown in Fig. 4. The further and completing movement of the reciprocating carriage and the other parts swings the arm $d'$ upon the hub $d^3$, and with it simultaneously the arm $d^2$ on the same hub, and the latch $l'$ passes over the point of the ratchet $f'$ and drops thereafter by the action of the spring and passes down the inclined face of the stop $f^2$ and returns through the groove (shown by dotted lines) under the ratchet $f'$ as the parts return to their normal positions. In this connection I would remark that in case one attempts to tamper with this apparatus by introducing a smaller coin than that required the same will pass right through the coin-carrier and fall away into the case and no result can be accomplished. In case one inserts a ring with the object of actuating the mechanism the pin 18 will pass through the open center of the ring as the mechanism is moved and nothing will be accomplished. On the other hand, if one attempts to actuate the mechanism with a coin to which a string is attached the coin after being inserted cannot be recovered by the string, because the coin will come against the stop-bars $n$ upon opposite faces of the frame and be held within the mechanism.

The movement of the coin-receiving mechanism simultaneously actuates a registering device $s$, Fig. 2, to indicate or keep tally with the number of pieces of money in the machine. This registering device is provided with a numbered dial and a crank-arm 33, to which the lower end of a rod 34 is pivoted, the upper end of the rod 34 being pivoted to a vertically-slotted movable plate $t$, held to a foundation by guiding-screws, (see Fig. 8,) and on the lower end of this plate $t$ is a roller 35, the roller being in an inclined slot in the cam-plate $u$, which cam-plate is slotted at 39 for guiding-screws placed for the horizontal movement of the said cam-plate. This cam-plate is provided with an arm $u'$ on one end, and a spring 36, connected at one end to the case, is connected at the other end to an eye of the said cam-plate, and the stud $l$, which in its forward movement actuates the pivoted arms $d'd^2$, simultaneously comes against the arm $u'$ to move the cam-plate $u$ and through the inclined slot and roller 35 to raise the movable plate $t$ and actuate the registering device, the spring 36 returning the plate $t$ and cam-plate $u$ to their normal position with the return to a normal position of the coin-receiving devices.

Upon the axis 2 of the weighing devices I place a fine-toothed wheel $r$, which turns with the indicator-dial as the same moves to indicate the weight and returns to its normal position, and I provide an arm 21, pivotally connected to an upright 22 in the case of the machine, the said connection being formed by a screw-stud 23, which secures the said arm to the upright, but permits a slight swinging movement. The right-hand end of the arm 21 is reduced in width to form a projecting finger, the upper surface of which forms a way for the latch-stud 31 of the pivoted arm $d^2$. To the left-hand end of the arm 21 I connect a rocker-bar $o$, the same having a weight at the left-hand end and a pivoted latch-bar $o'$ at the right-hand end. The rocker-bar $o$ and the arm 21 are pivotally connected by a screw-stud 26, and in a mortise of the bar $o$ there is a stud 24, secured to the arm 21, and a spring 25, with one end passing through the stud 24 and the other end engaging the bar $o$, and the bar $o$ is provided with a mortise 28, encircling the screw-stud 23, thus providing for the pivotal movement of the rocker-bar $o$ independent of the arm 21, and I provide a spring 29 between the short end of the latch-bar $o'$ and the surface of the bar $o$, and on the outer end of the latch-bar $o'$ there is a latch-stud 30. The rocker-bar $o$ is preferably made with an upward projection that is divided to form jaws for receiving and holding a removable tooth 27, which tooth is adapted to come into engagement with the fine-toothed wheel $r$ on the axis 2 of the indicator-dial $b$. In Fig. 3 the coin-receiving mechanism and the rocker-bar mechanism are only illustratively shown.

In the operation of the weighing-machine and considering that the parts are in the respective positions shown in Figs. 2, 4, and 5, a person to be weighed steps upon the platform and operating the lever and the rod thus pulls down the cross-head 5 and springs 7 and the rack 4, rotating the pinion 3, the axis 2, and the indicator-dial $b$, so that the zero-point of the indicator-dial, which in a normal condition is in line with the pointer upon the face $c$, is turned to bring the weight of the person in line with the said pointer on the ornamental face. In this position the weight is not seen, or, in other words, is concealed behind the shield $d$, covering the opening $c'$ in the ornamental face. The person now inserts a coin of the requisite denomination in the coin-slot 13. The same passes through the slot down the coinway $m$, beneath the stop-bars $n$, and into the coin-carrier $h$, where the same stops against the adjusting-screw 19. To complete the operation and discover the weight, the person now grasps the handle $e$, moving the same to the right through the curved slot in the case of the machine, and by means of the stud 15 moving along the reciprocating carriage $g$ and its slotted extension $g'$. This movement causes the lever $k$ to be rocked, the pin 18 to come down upon the coin, the coin-carrier $h$ and the latch-lever $h'$ to be tilted, and the latch $l'$ to be raised upon the ratchet $f'$. As the latch is lifted upon the ratchet the coin falls from the coin-carrier and the latch prevents an attempt to return the mechanism to a normal position. In this movement the finger $k'$, as hereinbefore described, serves to push the coin out of the coin-carrier, and as the movement continues the latch $l'$ travels to the second tooth of the ratchet and the stud $l$ comes simultaneously into contact with the lower end of the arm $d'$ and with the end of the arm $u'$, Fig. 8, and the completed movement of the coin-receiving device by means of the crank-arm $e'$ causes the stud $l$ to shift the arms $d'\ d^2$ upon the hub $d^3$ and swing the shield $d$ away from the opening $c'$ in the case and discover to the person upon the weighing-machine the weight upon the dial opposite the pointer upon the face $c$, and simultaneously with this movement the cam-plate $u$ is moved, the slotted plate $t$ is raised, and the registering device $s$ is operated to record an additional movement of the device. As the stud $l$ moves these parts the latch $l'$ drops over the end of the ratchet $f'$ and by the contractile action of the spring $i$ passes down the inclined face of the stop $f^2$ and returns to a normal position, with the latch $l'$ bearing upon the face of the frame, as shown in Fig. 4. With the return of the coin-receiving mechanism the spring 36, Fig. 8, returns the registering device to a normal position. With the swinging movement of the shield $d$ and the pivoted arms $d'\ d^2$ the rocker-bar $o$ and arm 21 are actuated by the latch-stud 31 passing along the face of the finger projection of the arm 21 and swinging the same on its stud 23 and simultaneously bringing the tooth 27 into contact with the fine-toothed wheel $r$, and as the arm $d^2$ completes its movement the stud 31 rides over the stud 30 upon the latch-bar $o'$, and passing down the opposite side thereof the flat faces of the studs 30 and 31 come into engagement, as shown in Fig. 6, so that the shield $d$ is held away from the opening $c'$ in the face. As the latch-stud 31 passes over the latch-stud 30 the rocker-bar $o$ and the arm 21 swing in their relation to one another upon the screw-stud 26 because of the engagement of the tooth 27 with the wheel $r$. The mortise 28 provides for this movement, and the stud 24 and spring 25 keep the bar $o$ and arm 21 in their relation to one another, the spring yielding with this movement and returning the bar $o$ and latch-bar $o'$ to a position where the studs are in engagement with one another. The arm $d^2$ moves between the finger of the arm 21 and the latch-bar $o'$, and this movement tends to separate these parts, and for this purpose the spring 29 is provided, so that the latch-bar $o'$ may yield as the stud 31 passes the stud 30 to bring the same into engagement. The shield $d$ is thus held away from the opening $c'$ in the face so long as the person being weighed remains on the platform. If the person attempts to step off and slightly reduces the weight upon the platform or if another person attempts to step on in an effort to obtain the weight of two people with one payment, the slight decrease of weight or increase of weight will necessarily cause a movement to the weighing device, and this movement will affect the fine-toothed wheel $r$ in one direction or the other and will cause the same to operate upon the tooth 27 to swing the rocker-bar $o$ and latch-bar $o'$ either up or down, either of which movements will be sufficient at the stud 30 to cause the same to pass above or below the stud 31 on the arm $d^2$ and free the shield, so that the spring 32 will immediately draw the shield toward the side of the case and close the opening $c'$ in the face $c$. In this manner it is apparent that in order to again discover a further weight upon the dial it will be necessary to go all through the operations described, together with the insertion of another coin.

I claim as my invention—

1. In a coin-controlled weighing-machine, the combination with the weighing mechanism, and a case having a coin-slot, of a coin-receiving device comprising a reciprocating carriage, a handle and crank-arm for operating the same, a coin-carrier, means actuated by the reciprocating carriage for contacting with the coin and swinging the coin-carrier and means for preventing the return of the reciprocating carriage until the movement has been completed, and an adjustable pin acting as a stop in the coin-carrier for the coin, and pivoted stop-bars connected to the coin-receiving device for preventing the withdrawal of the coin, substantially as set forth.

2. In a coin-controlled weighing-machine, the combination with the weighing mechanism and a case having a coin-slot, of a coin-receiving mechanism comprising a frame having a ratchet and stop at one end, a reciprocating carriage having a curved slotted extension and moving through the said frame, a crank-arm for moving the said carriage by hand, a coin-carrier and integral latch-lever pivoted to the reciprocating carriage, a stud and latch connected to the end of the latch-lever, a lever pivoted to the frame and at one end engaging the slotted extension of the reciprocating carriage and having means for contacting with the coin and pushing the same out of the coin-carrier, and a connection to the operated machine, whereby with the movement of the reciprocating carriage the coin-carrier is tilted and the latch brought into engagement with the ratchet and the stud into engagement with the connection to the operated machine, when the movement of the reciprocating carriage is completed, substantially as set forth.

3. In a coin-controlled weighing-machine, the combination with the weighing mechanism and a case having a coin-slot, of a coin-receiving mechanism comprising a frame having a ratchet and stop at one end, a reciprocating carriage having a curved slotted extension and moving through the said frame, a crank-arm for moving the said carriage by hand, a coin-carrier and integral latch-lever pivoted to the reciprocating carriage, a stud and latch connected to the end of the latch-lever, a lever pivoted to the frame and at one end engaging the slotted extension of the reciprocating carriage, said lever having a vertically-adjustable pin 18, and an adjacent inclined finger $k'$ the point of the pin 18 contacting with the surface of the coin and the finger $k'$ coming against the periphery of the coin, and a connection to the operated machine whereby with the movement of the reciprocating carriage, the coin-carrier is tilted and the latch brought into engagement with the ratchet and the stud into engagement with the connection to the operated machine when the movement of the reciprocating carriage is completed, substantially as set forth.

4. In a coin-controlled weighing-machine, the combination with a weighing mechanism and a case having a coin-slot, of a coin-receiving mechanism secured to the case and comprising a frame $f$ having a ratchet $f'$ and stop $f^2$ at one end and an arc slot at 16 and a coinway $m$ in the upper part, a reciprocating carriage $g$ having a slotted integral extension $g'$ curved to operate as a cam, a hand-operated crank-arm $e'$ having a stud 15 passing through the slot 16 of the frame and into a vertical slot in the reciprocating carriage, a coin-carrier pivoted to the reciprocating carriage and having a portion $h$ formed as slides receiving the coin, and an integral latch-lever $h'$ with a stud $l$ and latch $l'$ on the free end thereof, a spring $i$ at one end connected to the frame $f$ and at the other end to the latch-lever $h'$, a lever pivoted to the frame and a connection therefrom to the extension of the carriage for swinging the lever, means connected to the said lever for contacting the coin, removing the same and simultaneously swinging the coin-carrier, substantially as set forth.

5. In a coin-controlled weighing-machine, the combination with a weighing mechanism and a case having a coin-slot, of a coin-receiving mechanism secured to the case and comprising a frame $f$ having a ratchet $f'$ and stop $f^2$ at one end and an arc slot at 16 and a coinway $m$ in the upper part, a reciprocating carriage $g$ having a slotted integral extension $g'$ curved to operate as a cam, a hand-operated crank-arm $e'$ having a stud 15 passing through the slot 16 of the frame and into a vertical slot in the reciprocating carriage, a coin-carrier pivoted to the reciprocating carriage and having a portion $h$ formed as slides receiving the coin and an integral latch-lever $h'$ with a stud $l$ and latch $l'$ on the free end thereof, a spring $i$ at one end connected to the frame $f$ and at the other end to the latch-lever $h'$, a lever $k$ pivoted to the frame and at one end having a stud in the slot of the extension of the reciprocating carriage, whereby the lever is swung by the movement of the carriage, a pin 18 in the other end of the said lever and a finger $k'$ formed with the said lever, and an adjusting-screw 19 connected to the coin-carrier, substantially as set forth.

6. In a coin-controlled weighing-machine, the combination with a weighing mechanism and a case having a coin-slot, of a coin-receiving mechanism secured to the case and comprising a frame $f$ having a ratchet $f'$ and stop $f^2$ at one end and an arc slot at 16 and a coinway $m$ in the upper part, a reciprocating carriage $g$ having a slotted integral extension $g'$ curved to operate as a cam, a hand-operated crank-arm $e'$ having a stud 15 passing through the slot 16 of the frame and into a vertical slot in the reciprocating carriage, a coin-carrier pivoted to the reciprocating carriage and having a portion $h$ formed as slides receiving the coin and an integral latch-lever $h'$ with a stud $l$ and latch $l'$ on the free end thereof, a spring $i$ at one end connected to the frame $f$ and at the other end to the latch-lever $h'$, a lever $k$ pivoted to the frame and at one end having a stud in the slot of the extension of the reciprocating carriage whereby the lever is swung by the movement of the carriage, a pin 18 in the other end of the said lever and a finger $k'$ formed with the said lever, and an adjusting-screw 19 connected to the coin-carrier, the coin-carrier having an open center, which, together with the adjusting-screw 19 permits nothing smaller than the proper coin to pass through the machine, and stop-bars $n$ at the sides of the coinway to prevent the withdrawal of a coin or other device inserted in the coin-receiver, substantially as set forth.

7. In a coin-controlled weighing-machine, the combination with the weighing mechanism, of a coin-receiving device comprising a reciprocating carriage, a handle and crank-arm for operating the same, a coin-carrier, means actuated by the reciprocating carriage for contacting with the coin and swinging the coin-carrier, and means for preventing the return of the reciprocating carriage until the movement has been completed, substantially as set forth.

8. In a coin-controlled weighing-machine, the combination with the weighing mechanism, of a coin-receiving device comprising a reciprocating carriage, a handle and crank-arm for operating the same, a coin-carrier, means actuated by the reciprocating carriage for contacting with the coin and swinging the coin-carrier and means for preventing the return of the reciprocating carriage until the movement has been completed, and an adjustable pin acting as a stop in the coin-carrier for the coin, and bars connected to the coin-receiving device for preventing the withdrawal of the coin, substantially as set forth.

Signed by me this 9th day of February, 1900.

EDGAR H. COOK.

Witnesses:
GEO. T. PINCKNEY,
S. T. HAVILAND.